(12) United States Patent
Horng et al.

(10) Patent No.: US 7,633,687 B2
(45) Date of Patent: Dec. 15, 2009

(54) LINEAR MICRO MOTOR

(75) Inventors: Alex Horng, Kaohsiung (TW); I-Yu Huang, Kaohsiung (TW); Chung-Jen Huang, Kaohsiung (TW)

(73) Assignee: Sunowealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 12/155,871

(22) Filed: Jun. 11, 2008

(65) Prior Publication Data

US 2009/0251809 A1 Oct. 8, 2009

(30) Foreign Application Priority Data

Apr. 7, 2008 (TW) .............................. 97112448 A (51) Int. Cl.
G02B 15/14 (2006.01)
G02B 7/02 (2006.01)
G03B 17/00 (2006.01)
(52) U.S. Cl. .......................... 359/697; 359/824; 396/75
(58) Field of Classification Search ......... 359/696–698, 359/694, 676, 691, 813–814, 822, 824; 396/72–152
See application file for complete search history.

(56) References Cited

U.S. PATENT DOCUMENTS 5,365,296 A * 11/1994 Murakami et al. ............ 396/80
2008/0280231 A1* 11/2008 Horng et al. ................. 430/312

FOREIGN PATENT DOCUMENTS

TW 96116451 * 5/2009

* cited by examiner

Primary Examiner—Scott J Sugarman
Assistant Examiner—Dawayne A Pinkney
(74) Attorney, Agent, or Firm—Bacon & Thomas, PLLC (57) ABSTRACT

The present invention relates to a linear micro motor having an forward and backward reciprocating motion. The linear micro motor includes at least two actuators which can be a scratch drive actuator (SDA), a bounce drive actuator (BDA) or a combination thereof. To achieve the reciprocating motion, the linear micro motor is arranged in a way that at least two SDAs are disposed in an opposite manner, at least two BDAs are disposed in an opposite manner, or at least a SDA and at least a BDA are disposed in an identical manner. The linear micro motor of the present invention in accordance with the arrangement of the actuators can be realized to be applicable to a digital camera or camera phone by the advancing and receding linear motion caused by the motion of the actuators to achieve a focus-adjustable liquid crystal lens.

12 Claims, 9 Drawing Sheets

LINEAR MICRO MOTOR

FIELD OF THE INVENTION

The present invention relates to a linear micro motor, which possesses a linear motion featuring that the micro motor can move forward and back by means of the arrangement and motion of the actuator so that the linear micro motor can be substantially applied to a digital camera or a camera phone to address a focus-adjustable liquid crystal lens.

BACKGROUND OF THE INVENTION

Miniaturization technology is one of the major trends of contemporary science. Integrated circuit (IC) and micro electromechanical System are probably the most well-known technologies thereof and the preliminary technologies that lead us in the recent years to jointly explore the micro world.

Among them, the micro motors elaborately produced with the multi-user MEMS processes (MUMPs) developed by MEMSCAP attract the most attention, and the scratch drive actuator (SDA) or the bounce drive actuator (BDA) are brought into play as the key of actuation of the micro motor.

The SDA and BDA are all featured by the mechanical properties of precise positioning and step motion. Many have already published the research pertinent to actuators. Different arrangement of actuators can integrate to form a linear actuator or a step motor. Therefore, the SDA and BDA can be the major trend of the miniaturization technology.

Whereas, so far, the research and manufacture of the micro motor cannot be physically applied to the electronic industry. As the micro motor requires combining a multitude of critical miniaturization techniques, how to develop complete steps for integrating production processes to perform actual operation of the micro motor could be the challenge required to be most aggressively broken through currently.

In view of the foregoing concern, the present invention provides a linear micro motor which can be substantially applied to the photographing function of a digital camera or a camera phone by means of the arrangement and motion of the actuator, such that the linear micro motor so developed owns the miniaturization advantage.

SUMMARY OF THE INVENTION

The first object of the present invention is to provide a linear micro motor, which achieves a forward and backward reciprocating motion by the arrangement and motion of actuators and can be extensively applied to electronic products.

The second object of the present invention is to provide a linear micro motor, which is applicable to a digital camera or a camera phone by the arrangement and motion of actuators so that the camera lens can perform a linear displacement to focus based on the distance to an object and the size thereof and the picture of the object exhibits its optimized condition with the accuracy of the linear motion of the linear micro motor.

The present invention relates to a linear micro motor, which includes at least two actuators and possesses a forward and backward reciprocating motion. The actuators can be a scratch drive actuator (SDA), a bounce drive actuator (BDA) or a combination thereof. To achieve the reciprocating motion, the linear micro motor is arranged in a way that at least two SDAs are disposed in an opposite manner, at least two BDAs are disposed in an opposite manner, or at least a SDA and at least a BDA are disposed in an identical manner.

In accordance with the mounting method of the actuators, the linear micro motor of the present invention can perform an advancing and receding linear motion by virtue of the motion pattern of the actuators.

DETAILED DESCRIPTION OF THE PREFERRED EMBODIMENT

To make the aforementioned objective, features and advantages of the present invention more legible and comprehensible, preferred embodiments of the present invention are specifically presented as follows in conjunction with detailed illustrative description.

Figure 1A:
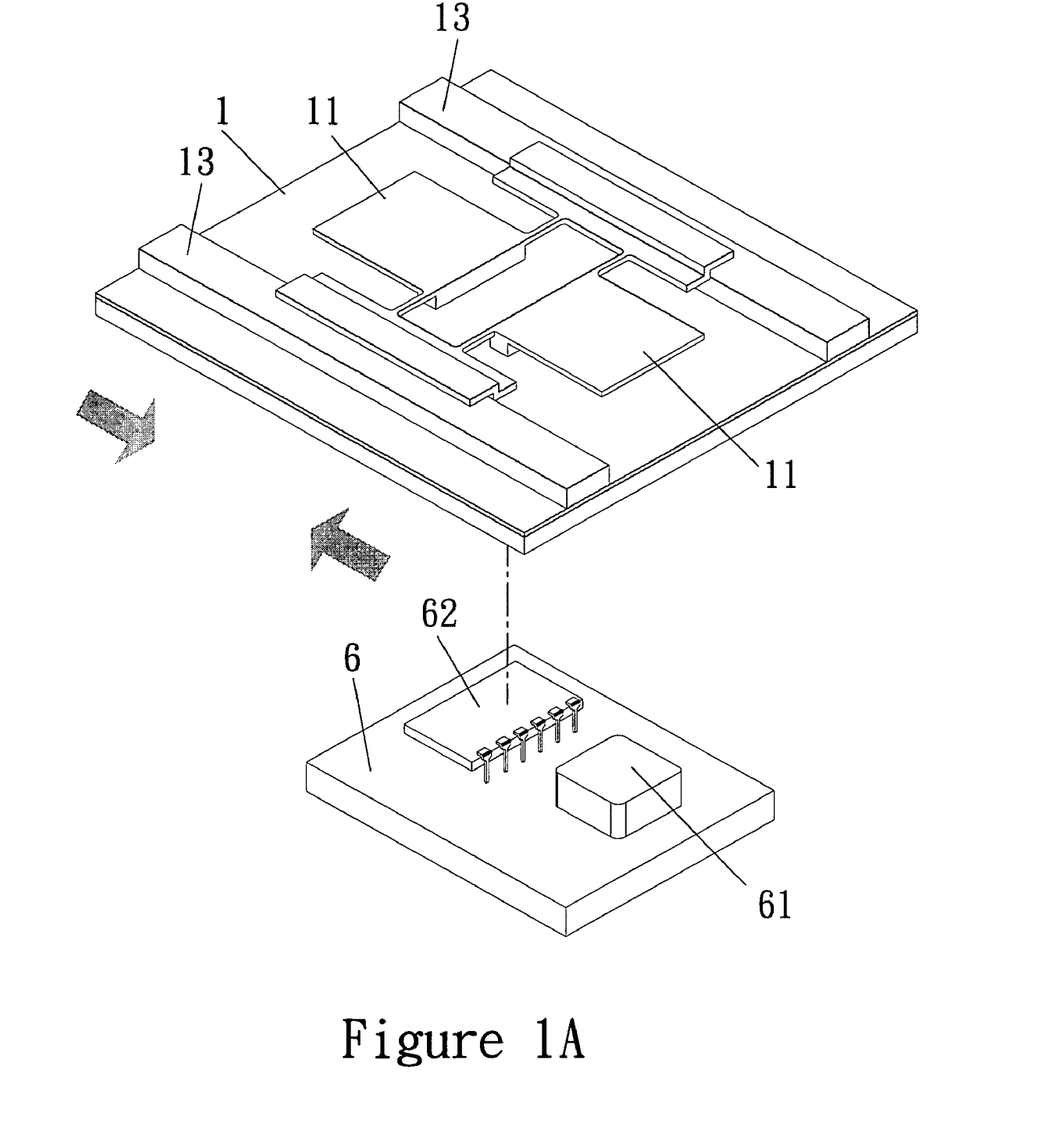
FIG. 1A is a schematic view showing a SDA of the present invention.

Please refer to FIG. 1A. The present invention provides a linear micro motor, including at least two actuators 11 and a circuit board 6 having an inductor 61 and a driving IC 62.

The linear micro motor 1 is integrated by arranging at least two SDAs 11, and the SDAs 11 are disposed in an opposite manner, in which the upper electrodes (not shown in FIG. 1A) of the linear micro motor 1 are mutually connected in series, the lower electrodes (not shown in FIG. 1A) of the linear micro motor 1 are mutually connected in series and are serially connected with the inductor 61 and the driving IC 62 on the circuit board 6. After a voltage is supplied, the actuators 11 of the linear micro motor 1 are controlled to operate in turn so that the linear micro motor 1 can move forward or back on the two parallel rails 13 in formation a reciprocating step displacement.

Figure 1B:
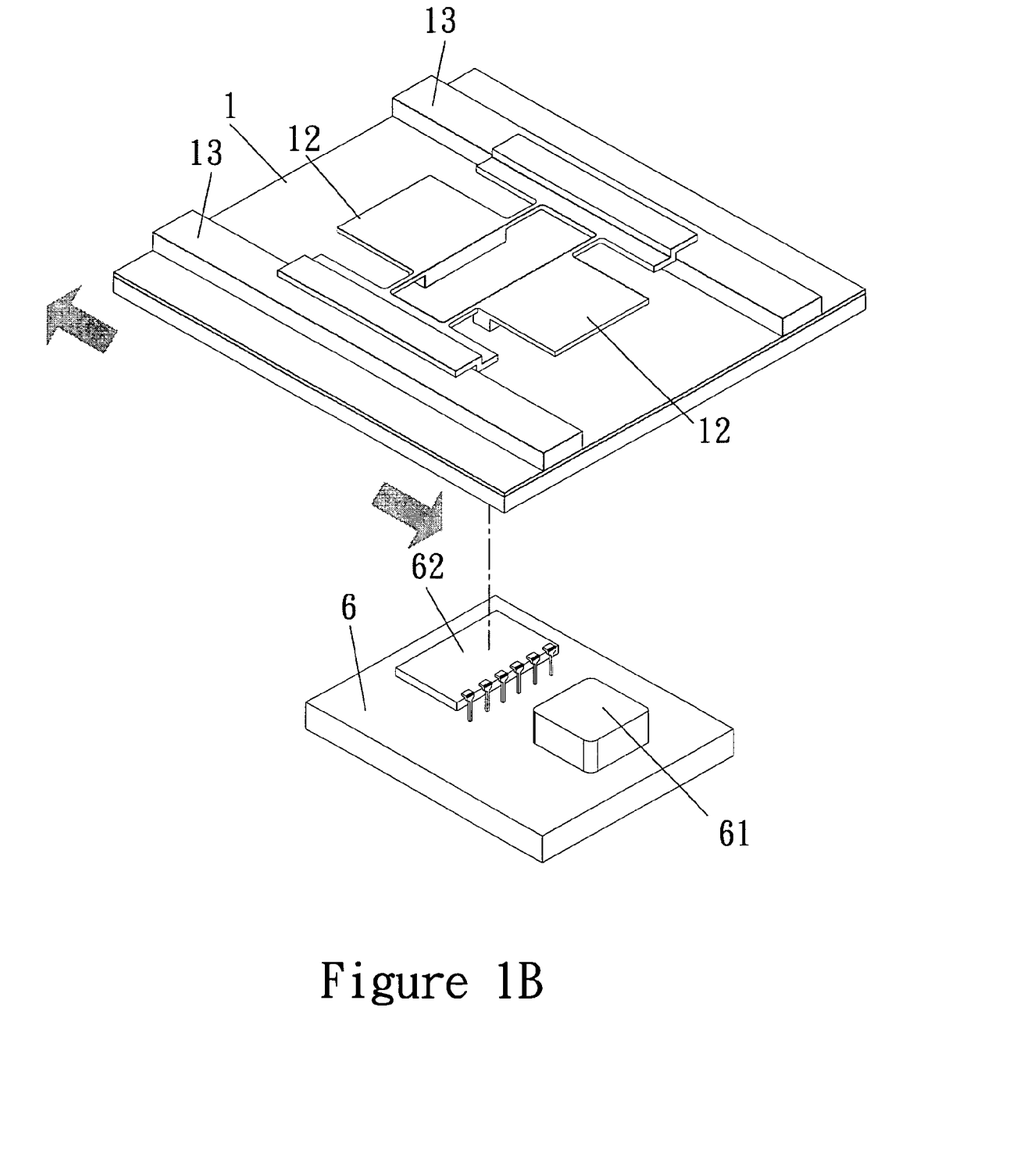
FIG. 1B is a schematic view showing a BDA of the present invention.

Please refer to FIG. 1B. The linear micro motor 1 is integrated by the arrangement of at least two BDAs 12, and the BDAs 12 are disposed in an opposite manner.

Figure 1C:
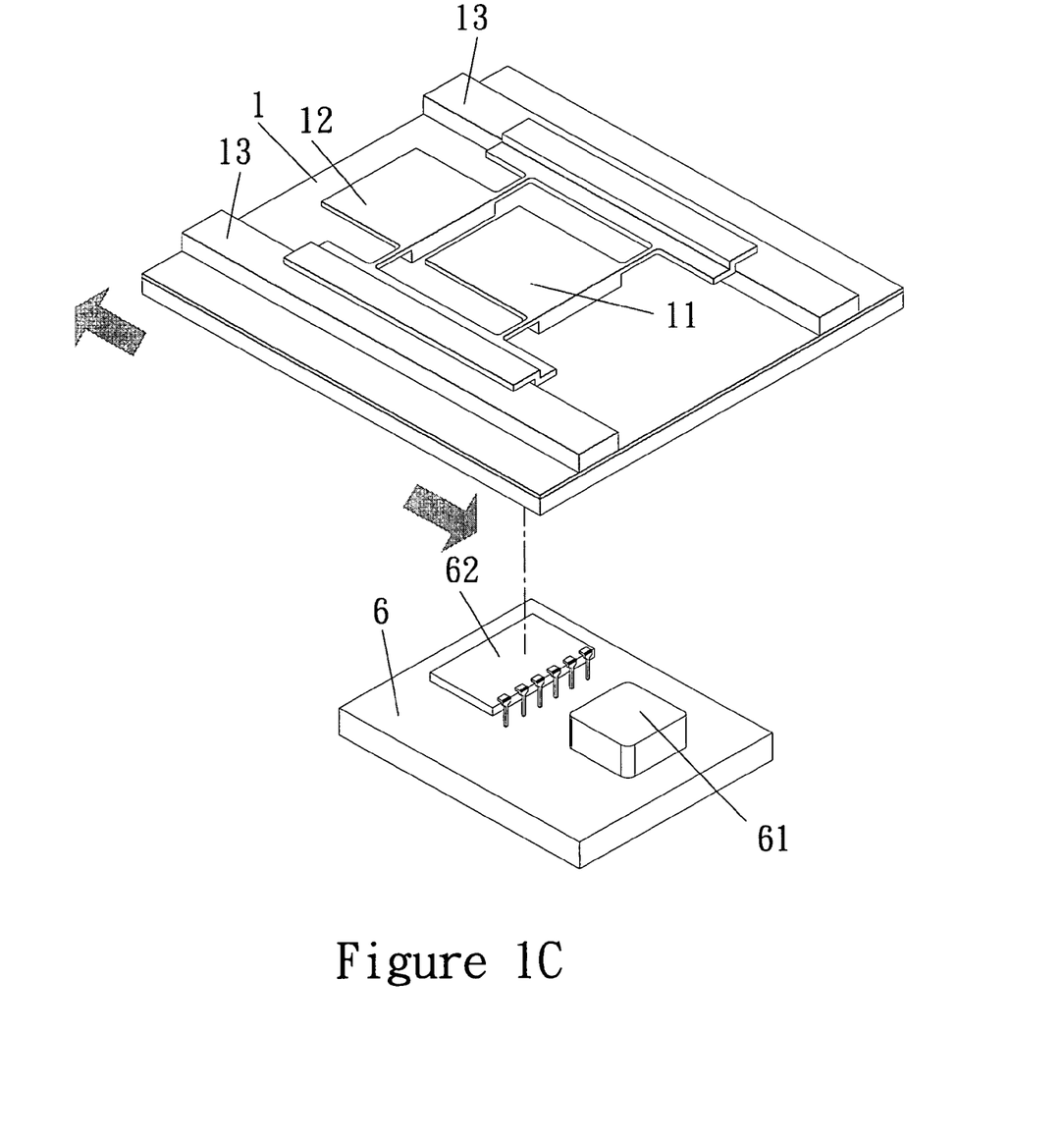
FIG. 1C is a schematic view showing a combination of a SDA and a BDA of the present invention.

Please refer to FIG. 1C. The linear micro motor 1 are integrated by the SDA 11 and the BDA 12 that are arranged in a same direction.

It is induced hereto that the present invention utilizes different arrangement and motion of the actuators to integrate the linear micro motor, and the linear micro motor follows the motion trajectory formed by different arrangement of the actuators by using the actuators to perform step displacement in turn after a voltage is applied.

Figure 2:
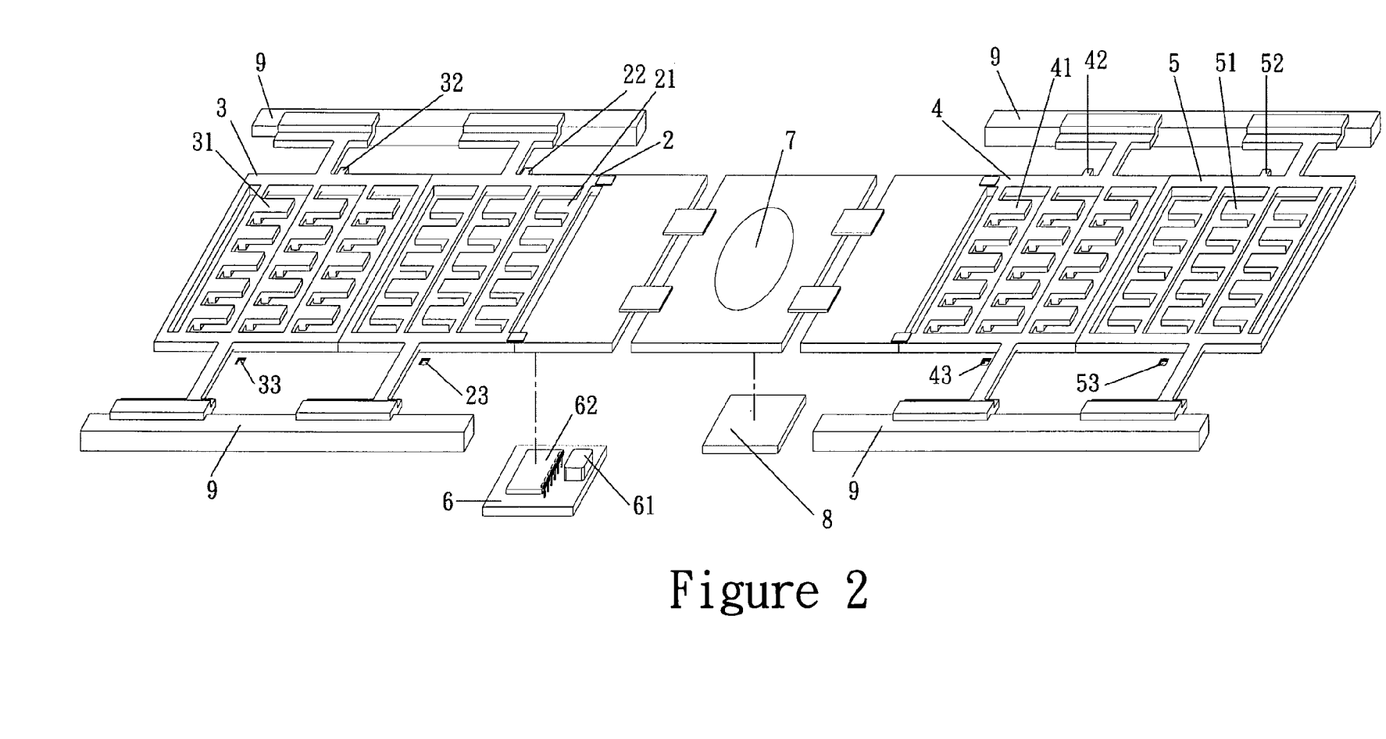
FIG. 2 is an external schematic view showing the present invention that is applicable to a digital camera and a camera phone.

Please refer to FIG. 2, which illustrates a linear micro motor of a digital camera or a camera phone to which the present invention is physically applied to achieve a focus-adjustable liquid crystal lens. The linear micro motor includes at least two actuators 21, 32, 41, 51 and a circuit board 6, in which the circuit board 6 contains an inductor 61 and a driving IC 62.

The linear micro motor is mounted to both sides of the lens 7 of the digital camera and the digital camera or the camera phone and can be the combination of the BDAs or that of the BDA and the SDA. As shown in FIG. 2, the linear micro motor is integrated by arranging the SDAs. The upper electrode 22 of the first micro motor 2 is serially connected with the upper electrode 42 of the third micro motor 4, the upper electrode 32 of the second micro motor 3 is serially connected with the upper electrode 52 of the fourth micro motor 5, the lower electrode 23 of the first micro motor 2 is serially connected with the lower electrode 43 of the third micro motor 2, the lower electrode 33 of the second micro motor 3 is serially connected with the lower electrode 53 of the fourth micro motor 5 and further serially connected with the inductor 61 and the driving IC on the circuit board 6. The motion of the linear micro motors 2, 3, 4, 5 on both sides of the lens 7 perform an advancing or receding linear motion in accordance with a signal of the image detector 8 by using the image detector 8 behind the lens 7 to detect the distance and size of the object ahead, to image and to transmit the signal to the linear micro motors 2, 3, 4, 5 via a signal transmission line. As a result, the adjustable liquid crystal lens can move forward or backward to lock the object, and thus the focusing motion of the lens that moves in accordance with the distance and size of the object can be performed.

Figure 3A:
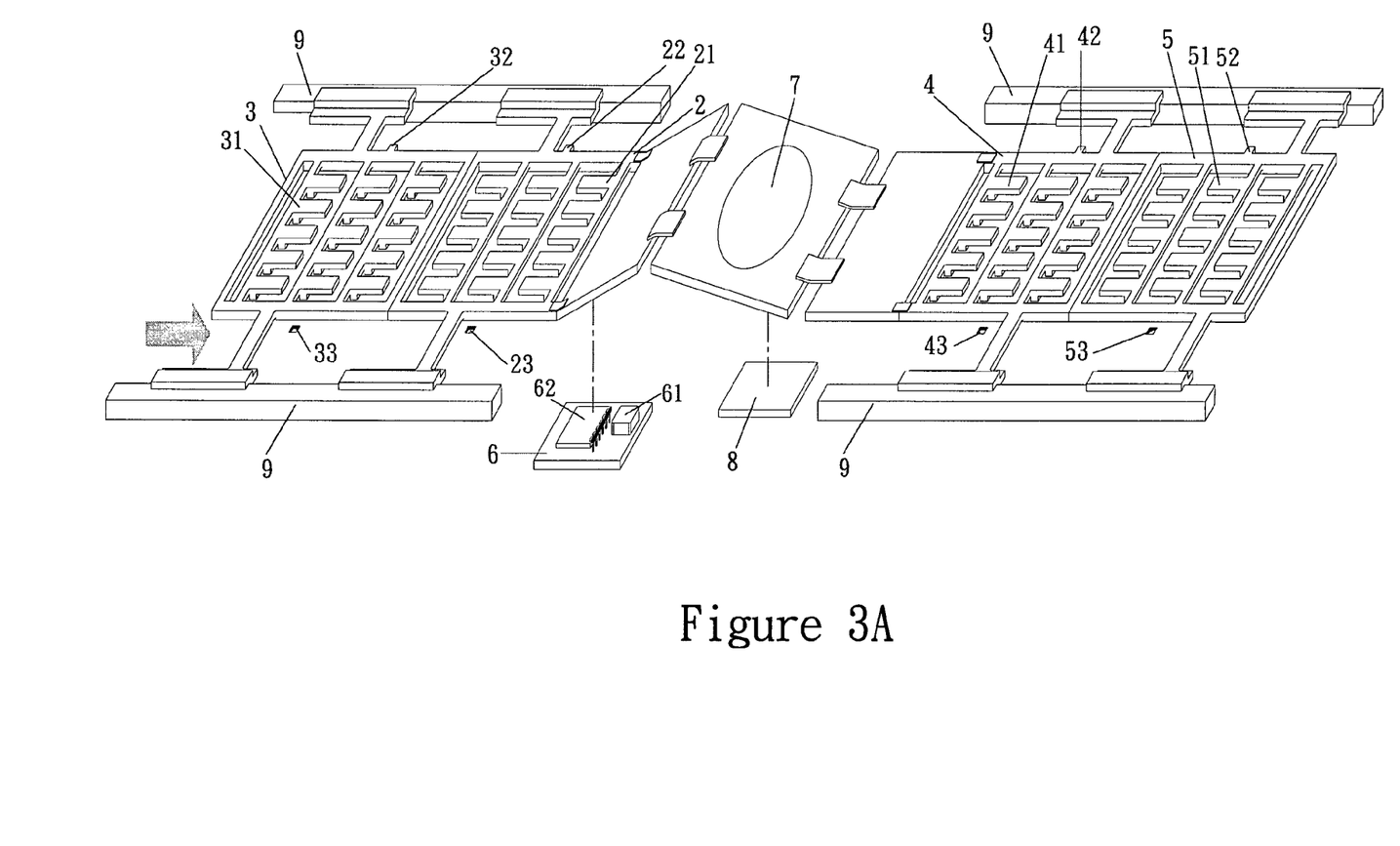
FIG. 3A is an external schematic view showing the present invention that is applicable to a digital camera and a camera phone.
Figure 3B:
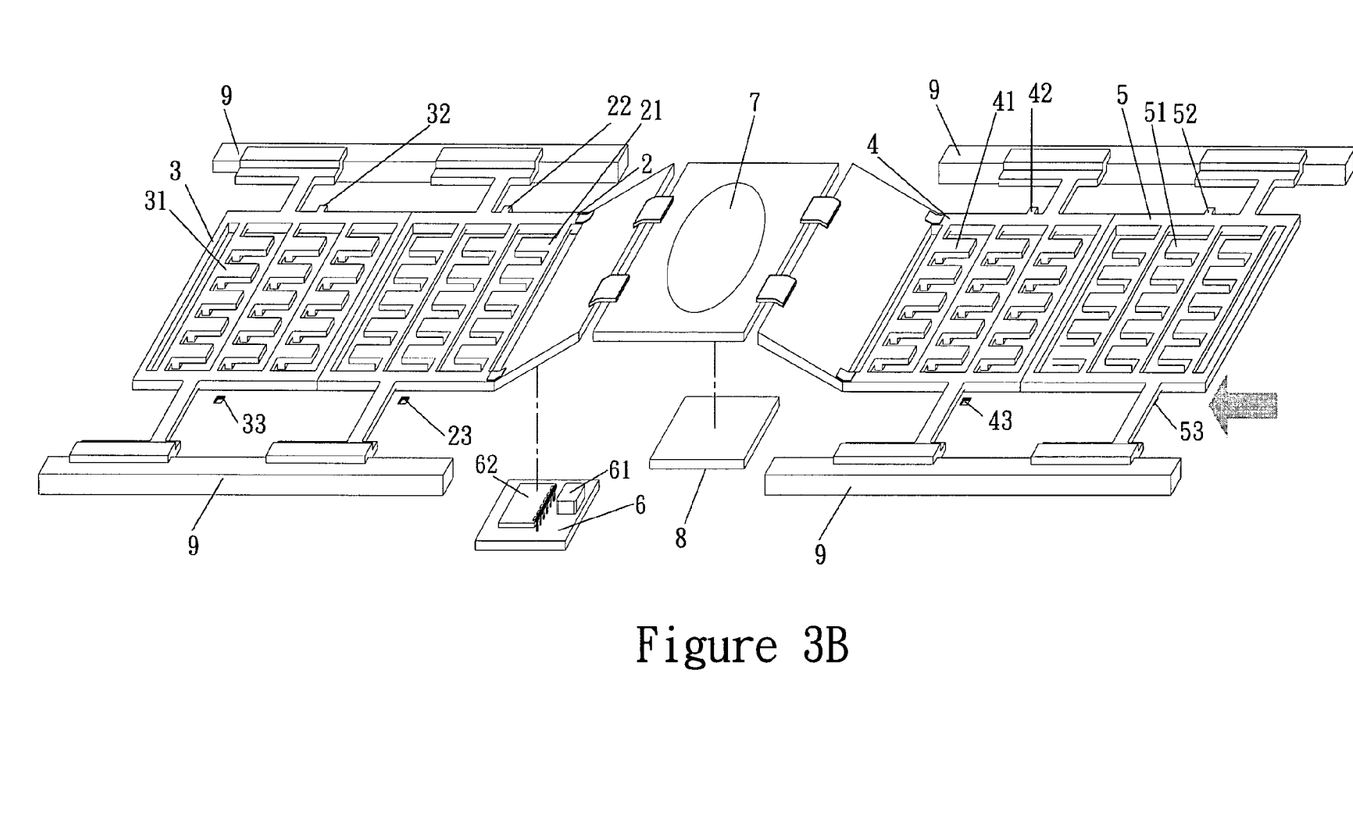
FIG. 3B is an external schematic view showing the present invention that is applicable to a digital camera and a camera phone.

Preferred embodiments of the linear micro motors of the present invention physically employed in digital camera or camera phone are enumerated hereafter. Please refer to FIG. 3A ad 3B. When the image detector 8 detects an object which is more distant and has a blurred image, the detected signal is transmitted to the first micro motor 2 through signal transmission. After a voltage is applied, the actuators 21 of the first micro motor 2 will immediately perform an advancing linear motion on the rails 9 to approach the lens 7. Subsequently, the detected signal is transmitted to the third micro motor 4 through signal transmission. After a voltage is applied, the actuators 41 of the third micro motor 4 will immediately perform an advancing linear motion on the rails 9 to approach the lens 7. Such continuous motion being a step displacement at the same time pushes the lens 7 forward. Hence, it is feasible for a digital camera or camera phone to take a picture distantly by virtue of the position to which the lens is moved by the micro motors.

Figure 4:
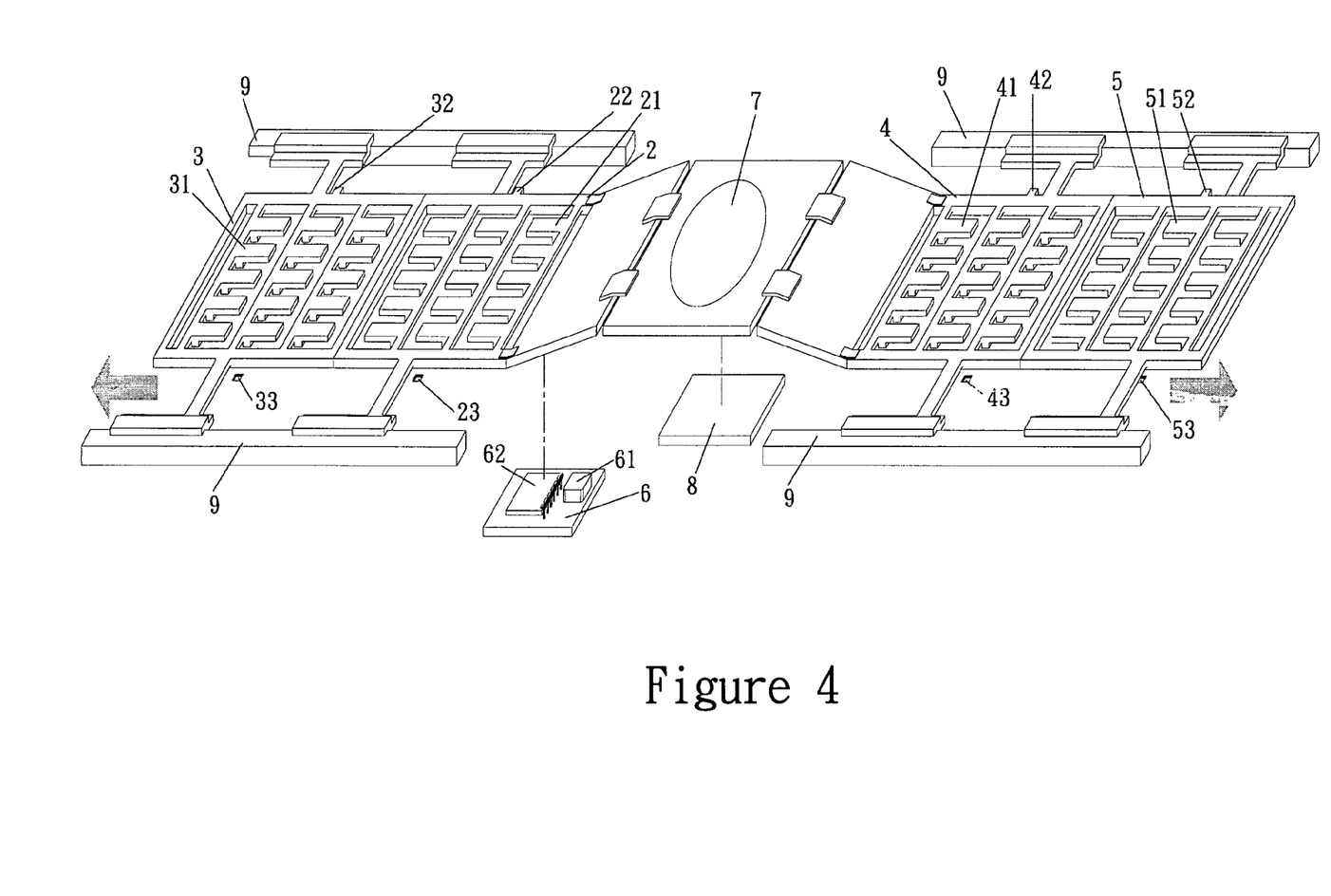
FIG. 4 is an external schematic view showing the present invention that is applicable to the motion of a digital camera and a camera phone.

Please refer to FIG. 4. When the image detector 8 detects an object which is near and has a clear image, the detected signal is transmitted to the second micro motor 3 and the fourth micro motor 5 through signal transmission. After a voltage is applied, the actuators 31 of the second micro motor 3 and the actuators 51 of the fourth micro motor 5 will immediately perform a receding linear motion on the rails 9 and then depart from both sides of the lens 7. Such continuous motion being a step displacement at the same time can move the advanced lens backward. Hence, it is feasible for a digital camera or camera phone to take a close picture by virtue of the position to which the lens is moved by the micro motors.

Figure 5:
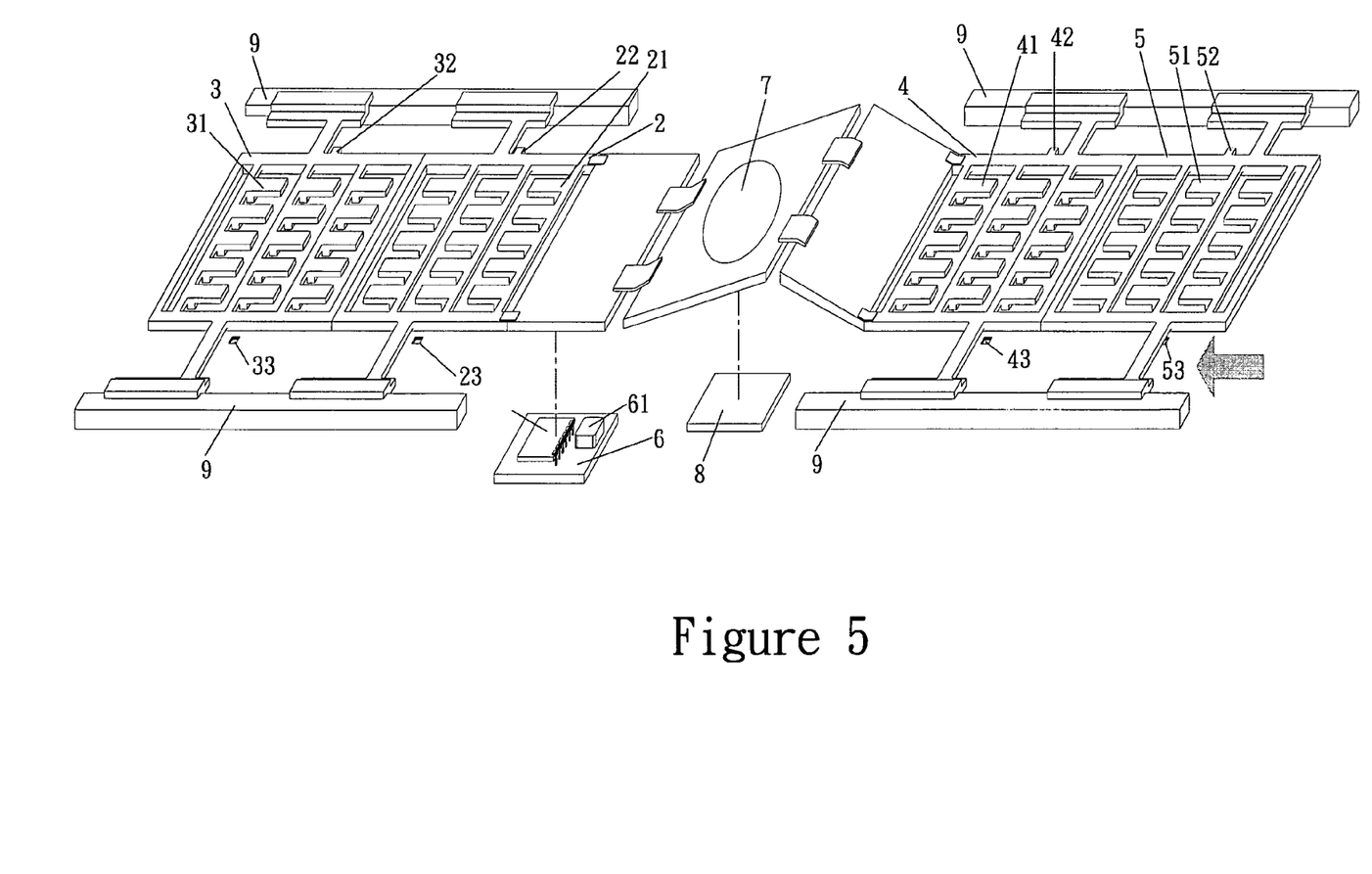
FIG. 5 is an external schematic view showing the present invention that is applicable to the motion of a digital camera and a camera phone.
Figure 6:
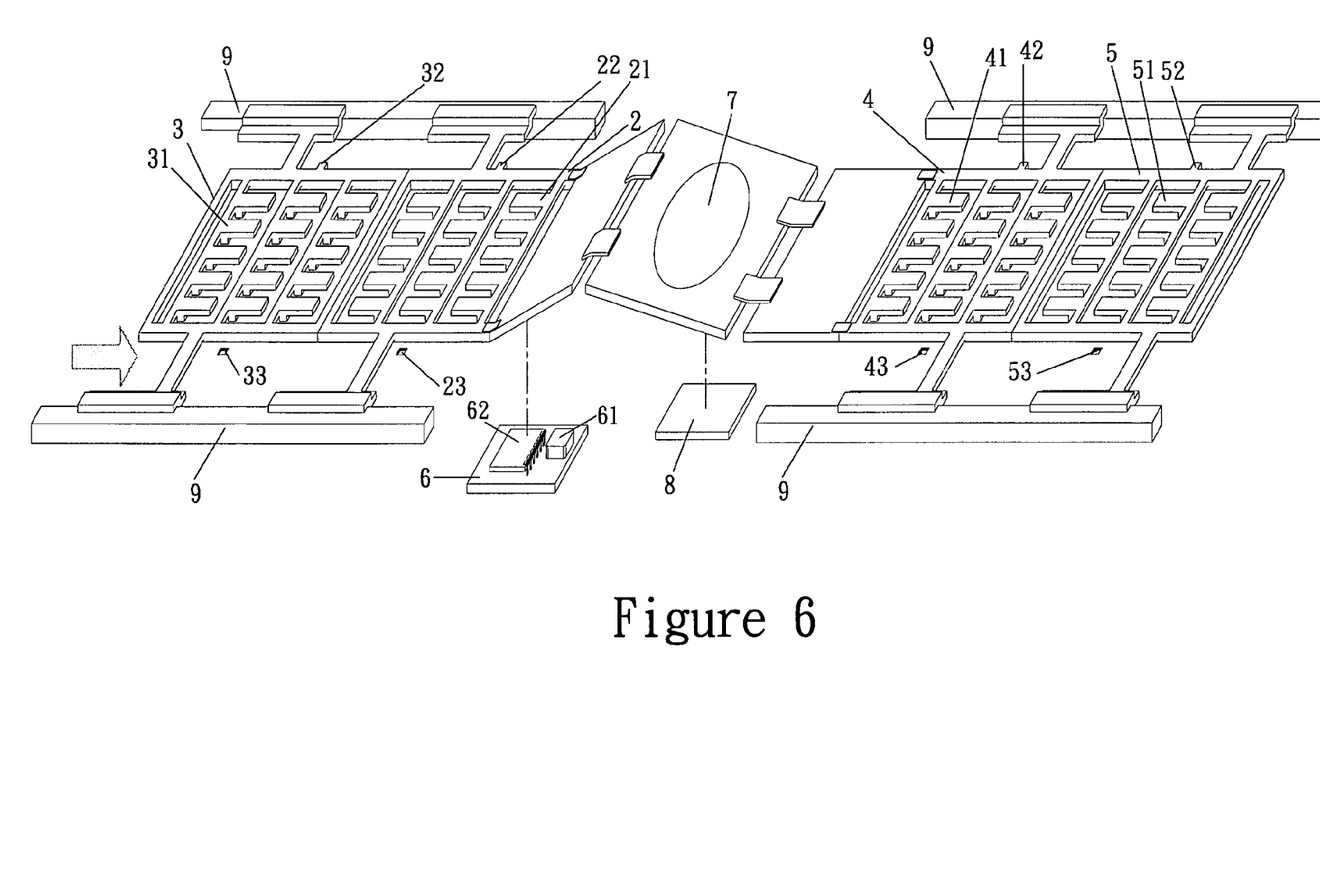
FIG. 6 is an external schematic view showing the present invention that is applicable to the motion of a digital camera and a camera phone.

Please refer to FIG. 5, which is another preferred embodiment showing an array micro motor module physically employed in a digital camera or camera phone and that the lens 7 is moved to the left. When the image detector 8 detects an object that leans to the left side and has a blurred image, the detected signal is transmitted to the third micro motor 4 through signal transmission. After a voltage is applied, the actuators 41 of the third micro motor 4 will immediately perform an advancing linear motion on the rails 9 to approach the lens 7. Such continuous motion being a step displacement at the same time pushes the lens 7 to the left. However, the present invention can move the lens 7 to the right as well as shown in FIG. 6. Hence, it is feasible for the digital camera or camera phone to take a picture either from the left side or right side thereof by virtue of the position to which the lens is moved by the micro motors.

In sum, the linear micro motors of the present invention achieve advancing and receding linear motion by the arrangement and motion of the actuators and can be realized in digital camera and camera phone to achieve the object of adjusting the focus of a liquid crystal lens. Besides, the present invention can be fully automatic and the size for miniaturization is not subjected to any limitation. However, the present invention is not limited to the use for digital camera and camera phone. Whatever industries in association with the actuator application all are applicable to the present invention.

While the invention has been described in terms of what is presently considered to be the most practical and preferred embodiments, it is to be understood that the invention needs not be limited to the circular disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A linear micro motor, comprising:
   at least two arrangements of actuators being arranged in accordance with an advancing motion direction and a receding motion direction so as to perform a reciprocating linear motion;
   wherein the actuators pertain to a combination of a scratch drive actuator and a bounce drive actuator.

2. The linear micro motor as set forth in claim 1, wherein the scratch drive actuator and the bounce drive actuator of the combination are disposed in a same direction.

3. The linear micro motor as set forth in claim 1, wherein the linear micro motor further comprises a circuit board composed of an inductor and a driving IC, the inductor and the driving IC are serially connected with an upper electrode and a lower electrode of the linear micro motor.

4. The linear micro motor as set forth in claim 1, wherein the actuators perform a step displacement on rails.

5. The linear micro motor as set forth in claim 1, wherein the linear micro motor is applicable to a digital camera.

6. The linear micro motor as set forth in claim 1, wherein the linear micro motor is applicable to a camera phone.

7. The linear micro motor as set forth in claim 6, wherein the linear micro motor of the camera phone is disposed on both sides of a lens, each linear micro motor is arranged with at least two actuators, upper electrodes of the linear micro motor with an identical motion pattern are serially connected, lower electrodes thereof with an identical motion pattern are serially connected and further connected with an inductor and a driving IC on a circuit board, and the actuators of the linear micro motor performs a continuous linear motion on rails after a voltage is applied.

8. The linear micro motor as set forth in claim 7, wherein the lens performs an advancing linear motion in accordance with a motion pattern of the linear micro motor.

9. The linear micro motor as set forth in claim 7, wherein the lens performs a receding linear motion in accordance with a motion pattern of the linear micro motor.

10. The linear micro motor as set forth in claim 7, wherein the lens moves to the left in accordance with a motion pattern of the linear micro motor.

11. The linear micro motor as set forth in claim 7, wherein the lens moves to the right in accordance with a motion pattern of the linear micro motor.

12. The linear micro motor as set forth in claim 7, wherein the linear micro motor is operated by using an image detector to detect an object and to transmit a detected signal to the linear micro motor.

\* \* \* \* \*